No. 653,232. Patented July 10, 1900.
M. GLEASON.
PICKER CHECK.
(Application filed Oct. 16, 1899.)
(No Model.)
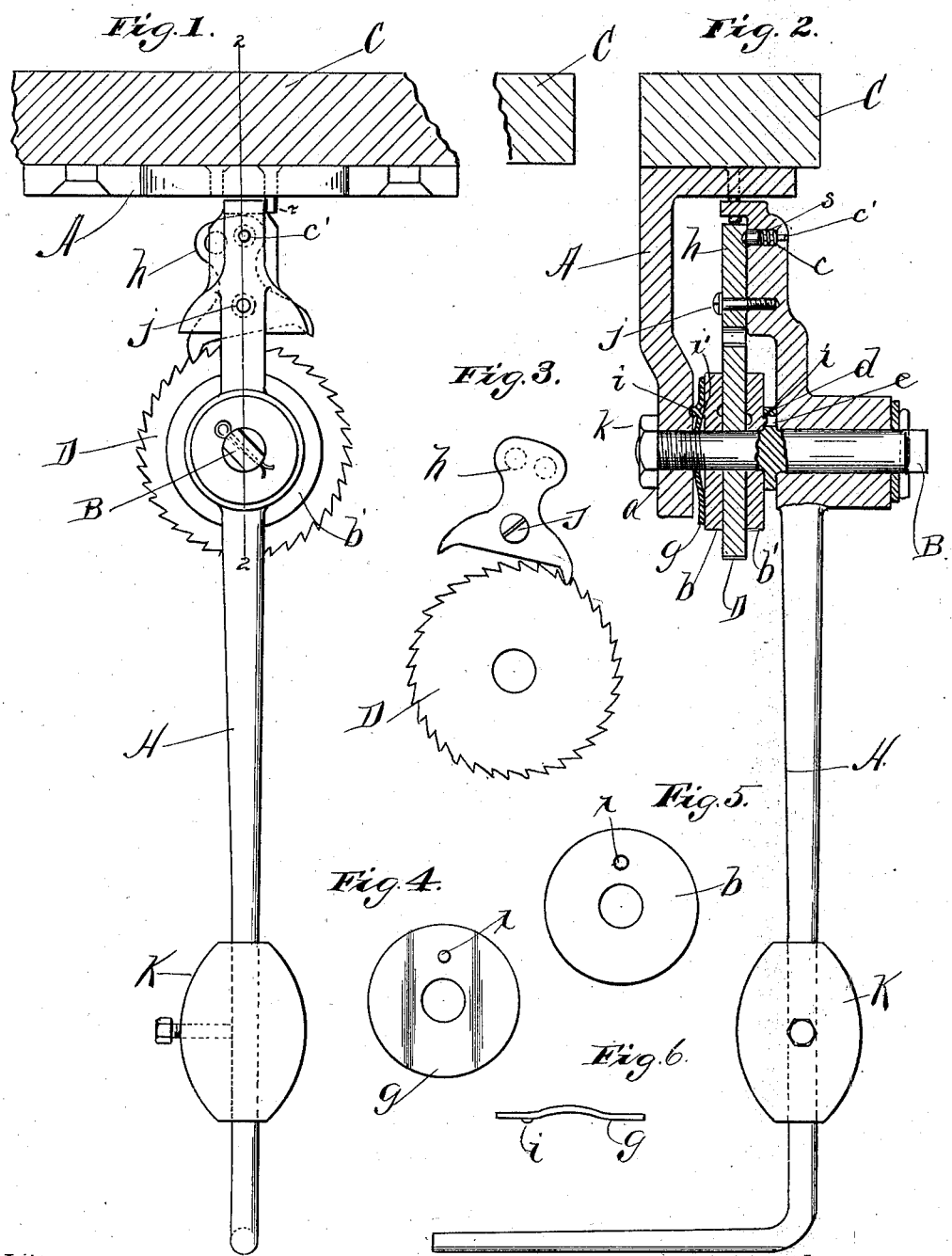
Witnesses
M. E. Cleveland.
Wm. Prall.
Inventor.
Merrill Gleason.
By Arnold & Barlow.
Attorneys

UNITED STATES PATENT OFFICE.

MERRILL GLEASON, OF WOONSOCKET, RHODE ISLAND, ASSIGNOR OF ONE-HALF TO FRED. B. WILKINS, OF SAME PLACE.

PICKER-CHECK.

SPECIFICATION forming part of Letters Patent No. 653,232, dated July 10, 1900.

Application filed October 16, 1899. Serial No. 733,771. (No model.)

*To all whom it may concern:*

Be it known that I, MERRILL GLEASON, of Woonsocket, in the county of Providence and State of Rhode Island, have invented certain new and useful Improvements in Checks for Loom-Shuttles; and I do hereby declare that the following is a full, clear, and exact description thereof, reference being had to the accompanying drawings, and to the letters of reference marked thereon, which form a part of this specification.

This invention relates to the devices used to check the motion of a picker in a loom and bring it easily to rest after it has been struck by the returned shuttle. It is fully explained and illustrated in this specification and the accompanying drawings.

Figure 1 is a front elevation of the check attached to the under side of the shuttle-bar. Fig. 2 shows a vertical section of the check, taken on line 2 2 in Fig. 1. Fig. 3 is a view from the inner side of the ratchet-wheel and the double pawl. Fig. 4 is a representation of the spring-washer. Fig. 5 represents one of the friction-washers. Fig. 6 is an edge view of the spring-washer.

The object of this invention is to produce a picker-check that shall bring the shuttles to a quick and easy stop without any rebound, which would defeat the object of the check. A shuttle can be effectually stopped without an extra check by putting enough pressure on the binder; but because of the great increase of power required to overcome the friction caused by that pressure of the binder in making the next throw of the shuttle and in the extra strain put on the shuttle-throwing mechanism, which is destructive of those parts, it is very desirable to bring the shuttle to a stop without any rebound that would make it necessary to have recourse to the binder again to prevent any back motion.

The construction of the check is as follows: A is a bracket attached by its flange to the under side of the shuttle-box C, a portion of which is shown. A hole $a$ is made in the lower end of this bracket, and a screw-thread is cut in it for a stud B, which has a solid collar $d$ made on it and a screw-thread made on one end to fit in the thread in the hole $a$ in the bracket. A ratchet-wheel D, two friction-washers $b$ $b'$, and a spring-washer $g$ are fitted to go easily on the stud B on one side of the collar $d$, and a lever H is fitted to swing easily on the stud on the other side of the collar $d$, and a pin is put through outside the hub of the lever H. A double-ended pawl $h$ is held on a screw-stud $j$, that screws into the upper end of the lever H, and a hole $s$ is made in the lever inside to receive an open spiral spring $c$, and a pin $c'$ is fitted to go inside the spring and has a shoulder on it large enough to press on the outer end of the spring and compress it when the taper or pointed end of the pin is pushed back in passing from one hole to the other in the pawl in bringing the different ends of the pawl into engagement with the ratchet-wheel. A pressure is applied to the ratchet-wheel between the collar $d$ and the standard A by means of a curved spring-washer $g$, (shown in Fig. 4,) which makes a friction between the ratchet-wheel D and the washers $b$ and $b'$ on each side of it, and this friction can be increased to any desired extent by loosening the check-nut $k$ on the end of the stud B and screwing the stud farther into the bracket H by its flat front end and compressing the spring-washer $g$ to produce the friction desired.

The three washers $g$, $b$, and $b'$ are prevented from turning with the ratchet-wheel D by swaging up a portion of the spring-washer to form a teat $i$ to enter a hole made in the bracket and swaging up a like teat $i'$ on the washer $b$ to enter the recess made in the washer $g$ in swaging the teat $i$, and, the washers $b$ and $b'$ being just alike, the teat $i'$ on reversing the washer for the other side would enter a hole $e$, made in the collar $d$, and hold that washer stationary. A small pin $r$ is put in the flange A, so as to project down and prevent the lever from swinging back beyond a vertical position. A weight K is made adjustable on the lower part of the lever H or may be cast on, sufficiently heavy to bring the lever back to a vertical position after it has been swung to one side by the picker-stick striking the horizontal arm at its lower end.

The operation is as follows: The normal position of the lever H is vertical, and when the picker is struck by the incoming shuttle the stick falls back against the horizontal arm at the lower end of the lever, which is bent off so as to cross its path, and the friction on the ratchet-wheel D, which is turned by the pawl, brings the picker-stick and shuttle easily to a rest without the risk of the rebound there is when the picker is stopped by an active spring.

The check can be made applicable to either a right-hand shuttle-box or a left-hand one by simply reversing the ratchet-wheel on the stud and depressing the other end of the pawl to engage with the reversed ratchet-wheel.

By making the weight K adjustable on the lever H its effect in bringing the lever back to vertical position can be regulated so as to be just sufficient to do it and not make any extra weight to cause a reaction on the picker-stick, and if by reason of the gumming of the oil or from dirt in the bearing it requires more effect the weight can be set nearer to the lower end of the lever.

Having thus described my improvements, I claim as my invention and desire to secure by Letters Patent—

1. In a picker-check, the combination of a bracket, a stud adjustably held in said bracket, a ratchet-wheel held on the stud, a spring-washer and a friction-washer held on the stud on one side of the ratchet-wheel, a friction-washer held on the other side of the ratchet-wheel, a lever held loosely on said stud, a double pawl held on the upper end of the lever to engage with the ratchet-wheel, and a weight held on the lower part of said lever, substantially as described.

2. In a picker-check, the combination of a bracket, a stud held adjustably in said bracket a ratchet-wheel held to turn on the stud, a spring-washer having a projection on it entering a hole in the bracket, a friction-washer also held on the stud and having a projection raised on it entering into a cavity in said spring-washer, a friction-washer on the other side of the ratchet-wheel having a projection on it fitting into a hole in a collar fast on the stud, a lever held to swing on said stud, a double pawl held on a pivot in the upper end of the lever, a spring-actuated pin held in the lever and having a conical point to enter cavities in said pawl and hold it in engagement with the ratchet-wheel, substantially as described.

In testimony whereof I have hereunto set my hand this 30th day of September, A. D. 1899.

MERRILL GLEASON.

In presence of—
FRANK E. FARNUM,
BENJ. ARNOLD.